United States Patent
Powell

(10) Patent No.: US 8,122,182 B2
(45) Date of Patent: Feb. 21, 2012

(54) ELECTRONICALLY ADDRESSED NON-VOLATILE MEMORY-BASED KERNEL DATA CACHE

(75) Inventor: Paul Powell, Holly Springs, NC (US)

(73) Assignee: NetApp, Inc., Sunnyvale, CA (US)

(*) Notice: Subject to any disclaimer, the term of this patent is extended or adjusted under 35 U.S.C. 154(b) by 472 days.

(21) Appl. No.: 12/353,017

(22) Filed: Jan. 13, 2009

(65) Prior Publication Data

US 2010/0180066 A1 Jul. 15, 2010

(51) Int. Cl.
- G06F 13/00 (2006.01)
- G06F 13/28 (2006.01)
- G06F 9/00 (2006.01)
- G06F 9/24 (2006.01)
- G06F 3/00 (2006.01)
- G06F 9/46 (2006.01)

(52) U.S. Cl. . 711/103; 711/147; 711/165; 711/E12.002; 713/1; 719/320

(58) Field of Classification Search .................. 711/103, 711/147, 165, E12.002; 713/1; 719/320
See application file for complete search history.

(56) References Cited

U.S. PATENT DOCUMENTS

| 2007/0136523 A1* | 6/2007 | Bonella et al. | 711/113 |
| 2010/0306522 A1* | 12/2010 | Wang | 713/2 |

* cited by examiner

Primary Examiner — Edward Dudek, Jr.
(74) Attorney, Agent, or Firm — Cooper Legal Group, LLC

(57) ABSTRACT

An operating system on a computer system can comprise a user space, which can comprise a persistent data store, and a kernel space, which can be extended by loading kernel modules. As provided herein, the kernel space can utilize kernel designated electronically addressed non-volatile memory (e.g., flash memory) to cache data from the user space persistent store, for example, upon a boot event. The kernel space can further comprise a cache controller that can be used to populate the kernel electronically addressed non-volatile memory with kernel in-memory data caches that comprise user space persistently stored data. In one embodiment, the kernel space can further comprise kernel designated volatile main memory (e.g., RAM), which can be used in conjunction with the kernel electronically addressed non-volatile memory to cache user space persistently stored data. In this way, kernel modules may access user space persistent store data from the RAM and/or electronically addressed non-volatile kernel cache.

25 Claims, 7 Drawing Sheets

ELECTRONICALLY ADDRESSED NON-VOLATILE MEMORY-BASED KERNEL DATA CACHE

BACKGROUND

In a computing environment, virtual memory is a technique that can give a computer application an impression that it is utilizing contiguous physical memory from the computer system, while its memory location may actually be fragmented, or even operated partially from disk storage. A computer system's memory may be allocated among kernel space and user space, for example, as virtual memory by the computer's operating system. The kernel space memory is typically reserved for running the kernel, its extensions, and kernel modules. The user space memory is typically used for running user mode applications. User space operations cannot typically access kernel space memory, while kernel space operations can map parts of user space memory to its own memory. That is, kernel operations can bleed over into user space, but user operations are typically not allowed to bleed over into kernel space.

A kernel is a basic component of an operating system on a computer system that can provide an abstraction layer for computer system resources, such as memory, processors, and input/output (I/O) devices. The kernel, for example, allows system resources to interact with application software running in user space that is often used to control these system resources.

A computer system typically allocates a portion of its main volatile memory (RAM) to the kernel and another portion of the RAM to the user space, creating a segregated virtual memory. In some systems, a portion of the user space memory may "spill over" to hard disk storage where, for example, RAM is limited. In this manner, some user applications can be swapped out to disk as needed. Kernel memory, on the other hand, is typically not swapped out to disk, but is instead maintained in RAM.

Normally, user space processes run in their own portion of the virtual memory and typically cannot access memory of another process. However, sometimes a process in user space may request the kernel to map a portion of another process's memory to its own, or may request shared memory regions with another process. Further, the kernel may need to access data in user space memory, such as persistently stored user space data, when a new kernel module comes online. For example, the kernel may need to access data regarding an operating system configuration, local settings, application settings, etc. that is stored in user space memory.

At startup, a certain number of kernel modules are loaded that correspond to expected system resources. However, not all possible kernel modules may be loaded because some potential resources may not be expected to be used, and/or are unknown. As such, for example, if a new resource becomes available to the system, a kernel module associated with the resource may then be loaded and request the user space memory to associate the new resource. In this example, the kernel may have to access the user space persistently stored data (e.g., configuration data) in order to associate the resource with a user space application process. Because the user space persistently stored data may be located on disk storage (e.g., have "spilled over" to hard disk storage), retrieval of the data can take a long time. Even if the data is not stored on disk, the kernel's attempt to retrieve data from the user space memory can slow down a computer system, for example, that may need fast loading kernel modules.

Therefore, some systems may cache (e.g., store, maintain) some user space persistently stored data to kernel space memory (this is generally referred to as kernel in-memory data cache), for example, at system boot. In this way, user space data needed for a kernel I/O module may be loaded more quickly. However, replicating data from user space to kernel space can be slow, and may impact boot time of a system, which can further exacerbate down time of a system if the system is rebooting after it goes down. Further, the data cache of user space persistently stored data is lost from volatile memory (e.g., RAM) during a system reboot (e.g., after a power loss), and will have to be re-replicated to the kernel space memory at a subsequent boot time, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Techniques and/or systems are disclosed herein for more efficiently storing kernel in-memory data caches that are made up of user space persistently stored data, where kernel in-memory data caches comprise data that is stored in kernel space memory to allow a kernel module to be loaded more quickly. In one embodiment, the techniques and systems comprise, among other things, using electronically addressed non-volatile memory (e.g., flash memory) in a computer system to store kernel in-memory data caches that comprise user space persistently stored data. In this manner, user related data that is typically persistently stored in user space memory, but that may be stored in kernel space memory to allow a kernel module to load more quickly is instead stored in electronically addressed non-volatile memory (rather than the kernel space memory). This is advantageous at least because electronically addressed non-volatile memory can retain data, for example, even during a power loss and/or system reboot, and retrieving data from a kernel electronically addressed non-volatile memory can be faster than retrieving it from a user space persistent store. Thus, storing kernel in-memory data caches that comprise user space persistently stored data as provided herein allows the data to be accessed faster and more easily and also reduces the need to re-load the data since the electronically addressed non-volatile memory maintains the data during power-down and re-boot operations. Additionally, as provided herein, one can use a kernel cache controller to populate the electronically addressed non-volatile memory with the kernel in-memory data caches that comprise user space persistently stored data.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
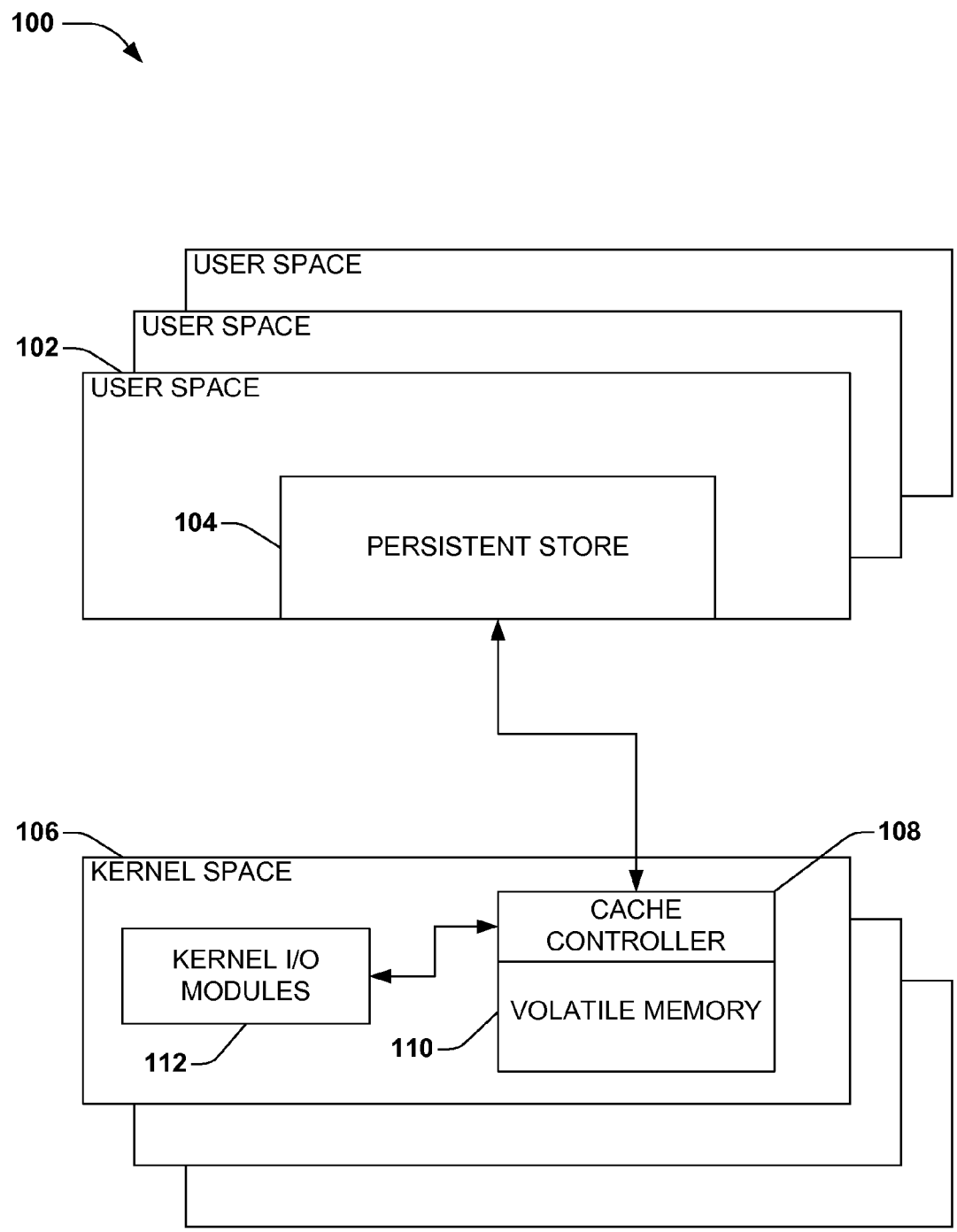
FIG. 1 is an illustration of typical embodiment of a kernel space and user space arrangement for kernel input/output modules.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Embodiments described herein relate to techniques and systems for storing kernel in-memory data caches that are made up of user space persistently stored data.

FIG. 1 is an illustration of an example embodiment 100 of portion of a current, typical operating system comprising user space 102 and kernel space 106. For example, the operating system may be installed on a computer system that utilizes the kernel space 106 as a lowest layer of abstraction for the computer's resources. In this example, the kernel can allow application software running in the user space to access the computer system's resources, such as a spreadsheet program accessing the computer's processor to perform a series of calculations on data in the spreadsheet.

In this example, the computer system may comprise a plurality of nodes arranged in a data storage and management network cluster. A node in a data storage and management network cluster can be a device attached to the network as a connection point, redistribution point or communication endpoint. A node may be capable of sending, receiving, or forwarding information over a network communications channel, and could comprise any device that meets any or all of these criteria. One example of a node may be a client computer terminal attached to a network. Another example of a node may be a data storage and management server attached to a network. The example embodiment 100 comprises three nodes, respectively comprising user space 102 and kernel space 106.

Kernel space 106 in respective nodes can further comprise a cache controller 108 which can be used to automate caching user space persistently stored data 104 to the kernel space cache store in the kernel's designated volatile memory 110 (RAM), as well as reading from the kernel space cache store. In one embodiment, the cache controller 108 can be implemented as computer software. In this embodiment, the software can comprise computer instructions, which when stored in a computer system's memory, for example, and executed by a processor, can implement the cache controller 108 in the kernel space 106.

As an example, when a computer system boots up, the cache controller 108 can replicate a portion (or all) of the user space persistently stored data, such as application software data that may utilize system resources, to the volatile memory RAM 110 designated for the kernel 108. In this example, while the user space persistent store may comprise one hundred percent of the cluster data, respective kernel caches may comprise one third of the user space persistent store.

In the example embodiment 100, a kernel I/O module 112 can be loaded into the kernel space 106. For example, a kernel I/O module 112 may be loaded to modify the kernel 106, in order to add functionality to a computer system for a new node added to the system. In this example, the kernel I/O module 112 may request data from the user space persistent store 104 using the cache controller 108. In this embodiment, the cache controller 108 may first look to the volatile RAM 110 for the requested data, to see if it was included in the user space persistent store replication that occurred at boot time. If the data is not found in the volatile RAM 110, in this example, the cache controller 108 can look to the user space persistent store 104 to retrieve the requested data for the kernel I/O module 112.

In this example embodiment 100 of portion of a current, typical operating system that may be utilized by a computer system, retrieving data for a kernel module from the user space persistent store 104 can be slow. Further, the data in the user space persistent store 104 will need to be re-replicated each time the system is booted, for example, or if a node in a cluster arrangement of servers is rebooted.

Figure 2:
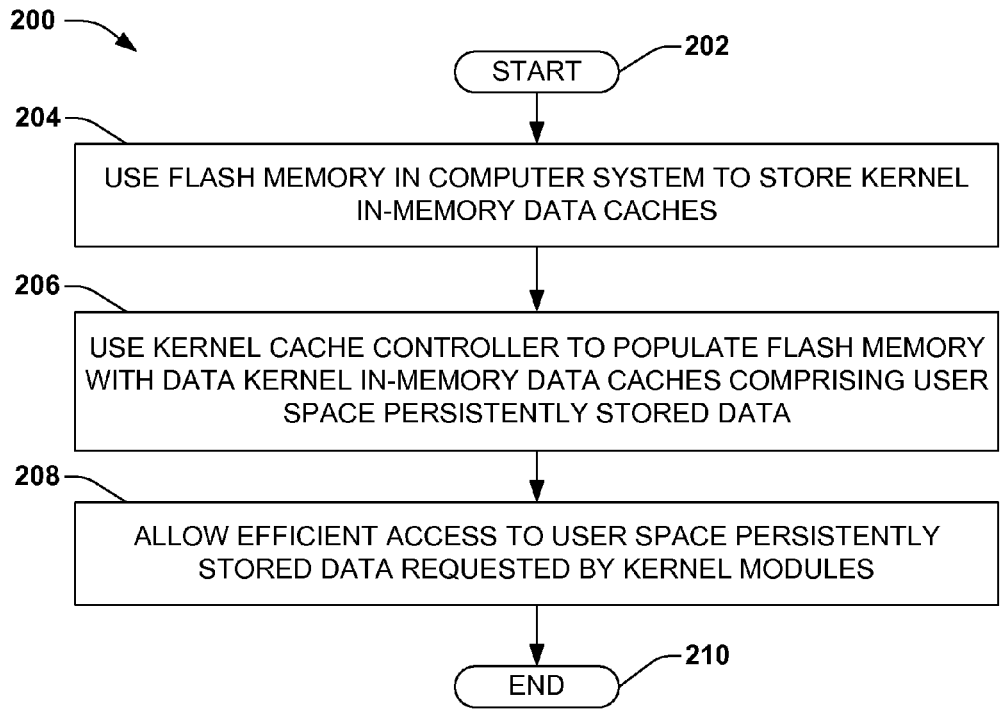
FIG. 2 is a flow diagram of an exemplary method for storing kernel in-memory data caches that are made up of user space persistently stored data.

FIG. 2 is a flow diagram of an exemplary method 200 for storing kernel in-memory data caches that are made up of user space persistently stored data. The exemplary method 200 begins at 202 and involves using electronically addressed non-volatile memory, such as flash memory, for example, in a computer system to store kernel in-memory data caches, at 204. As an example, in one embodiment, a computer system may utilize flash memory to store kernel cache data instead of using the computer system's volatile RAM. Flash memory is a non-volatile computer memory that can be electronically programmed and erased, requiring no power to maintain data stored in memory.

At 206 in the exemplary method 200, a kernel cache controller can be used to populate the electronically addressed non-volatile memory with kernel in-memory data caches that comprise user space persistently stored data. For example, user-space persistently stored data may comprise configuration data for a computer system on which an operating system, having both user space and kernel space, is installed. In this example, when the computer system boots (e.g., upon a startup or restart) the kernel cache controller can retrieve the configuration data from the user space persistent store (e.g., stored on a hard drive, or other storage disk) and cache the data to the electronically addressed non-volatile memory as an in-memory data cache.

In one embodiment, caching computer system configuration data from the user space persistent store to the electronically addressed non-volatile memory utilized by the kernel may allow a loaded kernel module quick access to the data. As an example, if a kernel I/O module is loaded to the kernel (e.g., to modify or extend the kernel to accommodate a new functionality for the computer system) the module will typically request computer configuration data, which is typically stored in the user space persistent store, or cached to kernel space designated volatile RAM. In this embodiment, in this example, the configuration data can be retrieved quickly from the electronically addressed non-volatile memory, as the configuration data was replicated to the electronically addressed non-volatile memory at boot time.

In this embodiment, an advantage to using the electronically addressed non-volatile memory for in-memory data caching is that retrieval of data from kernel-based electronically addressed non-volatile memory will be typically faster than accessing the user space persistent store from the kernel. Data access crossing a kernel/user space boundary can be slow, and the persistent store may be partially located on disk storage, which will add to data retrieval time. Further, the data stored in the electronically addressed non-volatile memory is not lost when the computer system goes down (e.g., caused by a power loss) or when the system reboots (e.g., due to a fatal error). In this embodiment, boot time (e.g., and therefore downtime) can be reduced if configuration data does not need to be re-replicated to memory, but merely updated where applicable.

In another embodiment, the computer system may comprise a plurality of nodes, for example, arranged as a networked storage system. In this embodiment, a kernel-based electronically addressed non-volatile memory for respective nodes may merely comprise a portion of the cached user space persistently stored data. As an example, if the computer system comprised four nodes, respective node's cache controllers may merely cache one quarter of the user-space persistent store to a kernel-based flash memory. In this example, respective nodes may be responsible for one quarter of work for the computer system; therefore, merely one quarter of configuration data needs to be available in respective kernel caches.

In this embodiment, for example, where data retrieval from the user space persistent store may require network access, using a kernel-based electronically addressed non-volatile memory (e.g., or a combination of electronically addressed non-volatile and RAM memory for kernel cache) can mitigate a need to access the network, which can be slow. In this example, if requested data is not on a same node as a running kernel, but located on a different node in the cluster, the data is retrieved by issuing requests across a cluster inter-connect. If the kernel cache is used to store user-space persistent data, slow cluster inter-connect requests may not be necessary.

In one aspect, read access times for a kernel accessing data stored in volatile RAM (e.g., SRAM or DRAM) designated to the kernel (e.g., segregated as virtual memory) are typically faster than if the kernel were to access same data from electronically addressed non-volatile memory designated to the kernel. In one embodiment of the techniques described herein, a portion of a computer system's volatile main memory can be designated for kernel space data caches, and be used in conjunction with electronically addressed non-volatile memory designated to the kernel.

In this embodiment, for example, the user space persistently stored data (e.g., computer system configuration data) can be replicated to the volatile RAM, and that portion of the user space persistently stored data that does not fit in the kernel designated volatile RAM can be replicated to the electronically addressed non-volatile memory (e.g., which can comprise flash memory for the kernel). In this example, the user space persistently stored data can be cached to the volatile main memory, for quicker read access, until it is full, and the remaining user space persistently stored data can be cached to the electronically addressed non-volatile memory.

In another embodiment, in this aspect, one may wish to adjust an amount of volatile RAM that is designated to the kernel for in-memory data caching of user space persistently stored data. As an example, a system administrator may wish merely to cache data to the volatile RAM that is most frequently accessed by kernel modules, while the remaining user space persistently stored data can be cached to kernel flash memory. In this example, if a system becomes heavily loaded, or additional resources become available, the amount of designated volatile RAM can be adjusted to accommodate the most frequent accessed data, while the remaining data is cached to the flash memory.

In one embodiment, for example, multiple I/O kernel modules may be requesting data from the cache controller for newly attached nodes to a network. In this example, a system administrator may manually allocate additional RAM space for the kernel, where the kernel can cache user space configuration data commonly requested by the kernel modules. In another embodiment, a system administrator may utilize a program that can identify when system resources are heavily loaded, and can automatically allocate additional memory for the RAM.

In another aspect, one may wish to utilize volatile RAM designated to the kernel for data that is most frequently accessed by kernel modules. As an example, different kernel I/O modules loaded to the kernel may request common data from the cache controller. In this example, having that common data cached to the volatile RAM can allow for a faster response to the requests. Therefore, keeping the most often accessed data cached to the volatile RAM may improve a computer system's performance.

In one embodiment, in this aspect, the kernel can utilize an algorithm that identifies RAM cached data that is "least-recently used" (e.g., has not been accessed for the longest time). Once identified, the kernel can use the cache controller, for example, to swap out the "least-recently used" data to a flash memory and replace it with flash cached data that is "more-recently used" by copying the most recently accessed data from the electronically addressed non-volatile memory 312 to the volatile memory 514. In this way, for example, the faster RAM can comprise cached data that is more often requested by kernel modules in the kernel, which can speed up performance of a computer system.

As an example, a swapping of data may comprise copying data from a first component to a temporary memory location while data from a second component is copied to the first component. In this embodiment, after data has been copied from the second component to the first component, the data in the temporary memory can be copied to the second component. It will be appreciated that those skilled in the art may devise alternate means for swapping data between components, and that the techniques and systems, described herein, are not limited to one particular embodiment. For example, data from a first and a second component can be copied to respective first and second temporary volatile memory locations. In this example, data in a first temporary memory location can then be copied to a second component, and data from a second temporary memory location can be copied to a first component.

As another example, when a kernel module requests data that is cached on the kernel's electronically addressed non-volatile memory, the data can be returned to the kernel module and cached to the kernel's volatile RAM. Further, in this example, to make room for the requested data on the volatile RAM, data that is "least-recently used" on the volatile RAM can be cached to electronically addressed non-volatile memory.

In another aspect, user space persistently stored data may be changed or updated by a user or application running in user space. If this data is changed in the persistent store, one may wish to synchronize the changed data with the replicated data located in either kernel space electronically addressed non-volatile memory or a combination of kernel space volatile memory and electronically addressed non-volatile memory, as described above. In this aspect, synchronization can involve merely updating the cached data with the changes, for example, instead of re-replicating the entire cache.

In one embodiment, a cache controller can be utilized to synchronize kernel-in-memory cache data, which may be located in merely electronically addressed non-volatile memory or may be in a combination of electronically addressed non-volatile and volatile RAM designated to the kernel, with the user space persistent store data. For example, when data is modified in the persistent store of the user space the cache controller can change data (e.g., replace the current data in the cache with the changed data in the persistent store) in the kernel cache to reflect the modifications. In this way, in this example, merely the modified data is changed without having to re-replicate all of the persistent store data.

In another embodiment, if the computer system comprises a cluster of nodes and the user space persistent store data is modified, for example, the cache controller may change the data in the kernel cache and re-allocate appropriate cached data in respective node's kernel caches based on a current configuration of work-load.

Further, in this aspect, in a computer system that comprises a cluster of nodes, when a new node is booted in the system one may wish to synchronize the kernel cache with the user space persistently stored data. As an example, if a cluster comprises three nodes respective kernel caches of user space persistently stored data may comprise one third of the persistent store data. In this example, when a fourth node is booted to the cluster the kernel cache for respective nodes can be synchronized with the user space persistent store for the four node cluster.

In one embodiment, at a boot event, the cache controller can be used to synchronize the kernel-in-memory cache data of the computer system with the user space persistently stored data. In this embodiment, the cache controller can update the kernel cache with merely persistently stored data that has been modified. Further, the cache controller can be used to re-allocate kernel-in-memory cache data, comprising user space persistently stored data, amongst respective nodes, for example, where a new node is booted to a multi-node computer system.

Figure 4:
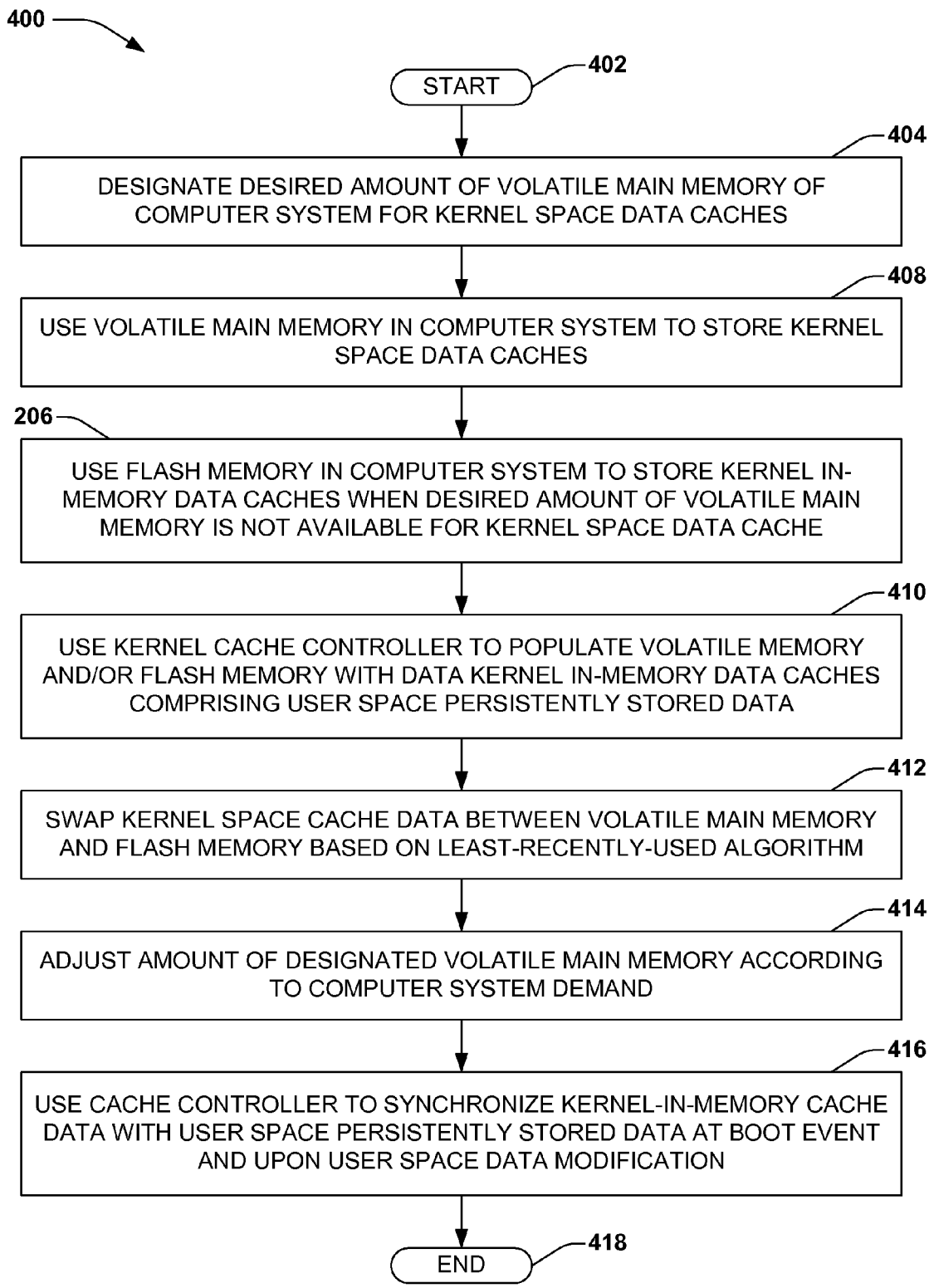
FIG. 4 is a flow diagram of an exemplary embodiment of a method for storing kernel in-memory data caches that are made up of user space persistently stored data.

FIG. 4 is a flow diagram of an exemplary embodiment 400 of a method for storing kernel in-memory data caches that are made up of user space persistently stored data. The exemplary embodiment 400 begins at 402 and involves designating a desired amount of volatile main memory of a computer system for kernel space data caches, at 404. As described above, for example, a portion of the computer system's main RAM can be designated (e.g., segregated) for kernel caching. In this example, the amount designated can be based the computer system's configuration and/or expected work load. In one embodiment, an amount of RAM allocated for kernel caching may be based on a portion (e.g., a percentage) of the computer system's total memory, for example, respective nodes in a clustered storage system may allocate twenty-five percent of their RAM. At 408, the designated volatile main memory of the computer system can be used to store kernel space data caches.

At 206, in the exemplary embodiment 400, electronically addressed non-volatile memory in the computer system can be used to store kernel in-memory data caches when a desired amount of the volatile main memory of the computer system is not available (e.g., the designated amount of volatile RAM is full). As described above, for example, the volatile RAM can be used for kernel caching, and when the RAM is full electronically addressed non-volatile memory can be used for additional kernel caching.

At 410, a kernel cache controller can be used to populate the electronically addressed non-volatile memory and/or the volatile main memory with kernel in-memory data caches, which can comprise user space persistently stored data. As described above, for example, data stored in the persistent store of user space may be replicated to the kernel memory, which can comprise both the volatile RAM and electronically addressed non-volatile memory designated for kernel caching. In this example, the kernel cache controller can be used to replicate the data to the kernel's designated memory.

At 412, kernel space cache store data can be swapped between the volatile main memory and the electronically addressed non-volatile memory of the kernel, based on a "least-recently-used" algorithm. As described above, for example, the cache controller can be used to move cached data that is more recently used into the volatile memory, while moving cached data that is least recently used to the electronically addressed non-volatile memory designated to the kernel.

At 414, an amount of designated volatile main memory used for kernel caching can be adjusted according to the computer system's demands. As described above, for example, if the system becomes heavily loaded or less loaded, the amount of volatile RAM designated for kernel caching can be adjusted up or down to meet demands.

At 416, the cache controller can be used to synchronize kernel in-memory cache data with user space persistently stored data at a boot event and upon user space data modification. As described above, for example, if a new node is booted to a computer system, the persistent store data can be synchronized with the kernel cache data; and if the persistent store data changes, the kernel cache can also be synchronized to the modifications. Having synchronized the data, the exemplary embodiment 400 of the method ends at 418.

In another aspect, user space of an operating system on a computer system may comprise no persistent store. For example, system configuration data may not be stored in the user space's virtual memory. In one embodiment, in this aspect, system configuration data may be stored in electronically addressed non-volatile memory designated for kernel space of the operating system. Further, kernel modules that are loaded to the kernel can access both kernel space data and user space data through the kernel data cache, which can comprise the system configuration data stored in the kernel electronically addressed non-volatile memory. In this way, for example, user space persistent store data need not be replicated to the kernel cache, thereby facilitating a faster boot time and mitigating re-replication of data across the kernel/user space border.

Figure 3:
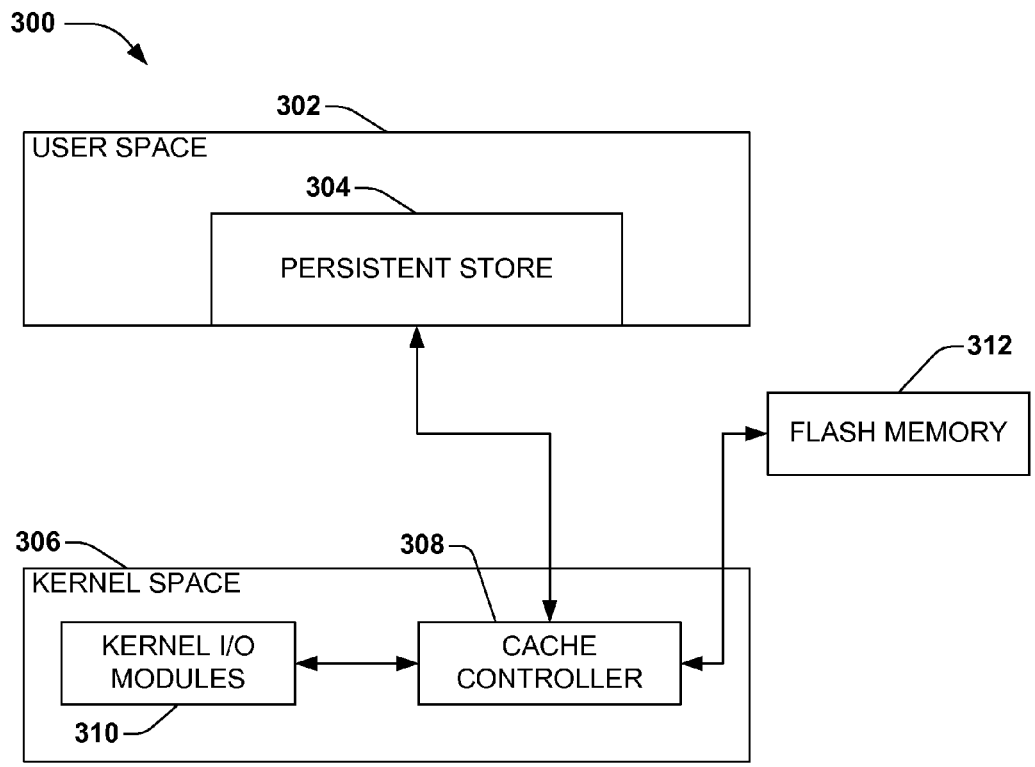
FIG. 3 illustrates an exemplary system for storing kernel in-memory data caches that are made up of user space persistently stored data.

A system may be devised for using electronically addressed non-volatile memory (e.g., flash memory) to store kernel in-memory data caches. FIG. 3 is a component block diagram of an exemplary system 300 for storing kernel in-memory data caches that are made up of user space persistently stored data. The exemplary system 300 comprises electronically addressed non-volatile memory 312 that is configured to store kernel-in-memory data caches. Electronically addressed non-volatile memory 312 is a non-volatile computer memory that can be electronically programmed and erased, requiring no power to maintain data stored in memory. Therefore, as an example, kernel-in-memory data caches that are stored on electronically addressed non-volatile memory 312 designated for the kernel 306 can be retained in memory when power to a computer system is lost. In contrast, when power is lost to current systems that utilize volatile memory (e.g., a computer system's main RAM) to store a kernel cache, the cached data is lost and may need to be re-replicated upon booting the system.

The exemplary system 300 further comprises a kernel cache controller 308 that is configured to populate the electronically addressed non-volatile memory 312 with data kernel in-memory data caches comprising user space persistently stored data. For example, data stored in a user space 302 persistent store 304 can comprise system configuration data that may be requested by kernel modules 310 loaded to the kernel 306 to add functionality or extend the kernel. In this example, accessing the requested data from the persistent store 304 in user space 302 can be slow, as data access crosses a kernel/user space boundary, and the persistent store 304 may comprise disk storage (e.g., requested data may be stored on a hard disk in the computer system, utilized for the persistent store). In another example, in a clustered computer system comprising a plurality of nodes, accessing persistent store data may be slow if desired data is located on a different node than the local node calling for the desired data.

In one embodiment, the kernel cache controller 308 can populate electronically addressed non-volatile memory 312, which has been designated to the kernel for in-memory data caches, with data (e.g., system configuration files) from the persistent store 304 in user space 302 of a computer system. In this embodiment, as an example, the persistent store may be comprised of user space data from one or more nodes in a computer system, such as a networked data management and storage system. In this example, if the system comprises more than one node, respective nodes can comprise kernel designated electronically addressed non-volatile memory that can be populated with user space persistently stored data allocated according to an expected workload for the system (e.g., in a three node system, respective kernel electronically addressed non-volatile memories may comprise one third of the persistent store data).

Figure 5:
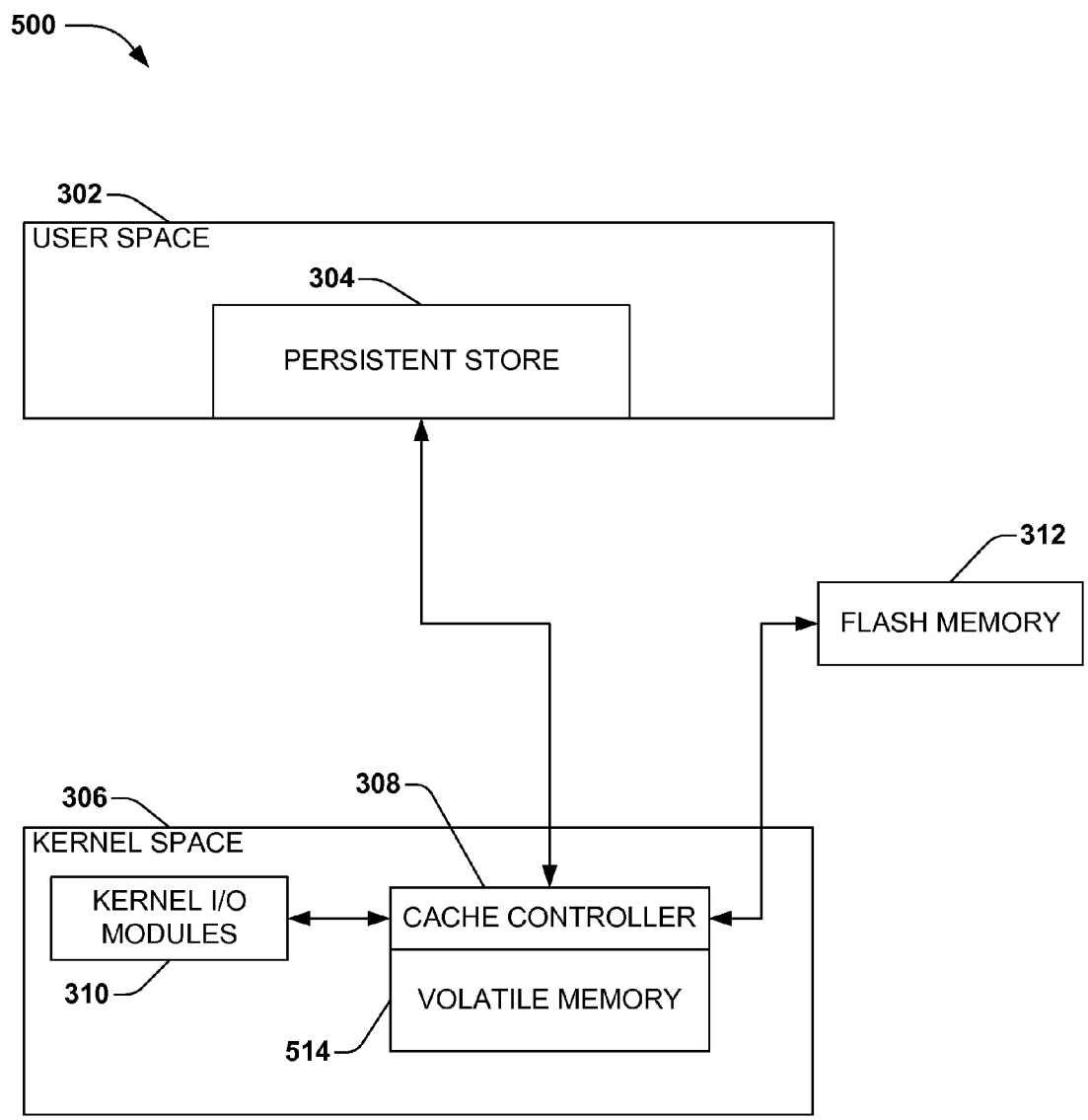
FIG. 5 is a component block diagram of an exemplary embodiment of a system for storing kernel in-memory data caches that are made up of user space persistently stored data.

FIG. 5 is a component block diagram of an exemplary embodiment 500 of the exemplary system 300, described above. In the exemplary embodiment 500, the system comprises electronically addressed non-volatile memory 312 and a kernel cache controller 308, as described above. In this embodiment, the system comprises volatile memory 514 (e.g., main system RAM) that has been designated for use by the kernel 306 for in-memory data caches.

In one embodiment, as an example, the volatile memory 514 may be a segregated portion of the computer system's main volatile RAM, designated for kernel caching of data from the persistent store 304 of the user space 302. In this example, the volatile memory 514 may comprise 10% of the cached persistent store data, while the electronically addressed non-volatile memory 312 can comprise all of the cached persistent store data. In this way, in this example, a kernel module 310 loaded in kernel space 306 may access requested data quickly from the volatile memory 514 if it is present. Further, if the requested data is not cached in the volatile memory 514 the cache controller 308 can retrieve the requested data from the electronically addressed non-volatile memory 312, which can be faster that attempting to retrieve the data from the persistent store 304 of the user space 302.

Further, in this embodiment, an amount of volatile memory 514 that is designated for kernel in-memory data caching can be set to a desired amount based on, for example, expected work load, computer system configuration, and computer system resources. In this example, a system that may not be utilizing many loaded kernel modules 310 may designate a smaller portion of the main system's RAM for kernel caching, which can free up the RAM for other uses. Additionally, one may wish to adjust the amount of volatile memory used based on a change in the workload, or if a new node is added to a clustered arrangement system (e.g., a networked storage system).

In another aspect, a system may be devised, that incorporates one or more of the components described above, that swaps kernel cached data (persistently stored user space data) between the volatile memory and the electronically addressed non-volatile memory designated to the kernel space. In one embodiment, for example, because read access times to volatile RAM are typically faster than to electronically addressed non-volatile memory, one may wish to keep kernel cached data that is most often accessed by loaded kernel modules in the volatile memory.

Further, in this aspect, when a kernel module, such as a kernel I/O module, is loaded to the kernel, it may request system configuration data from the kernel cache controller, for example. In one embodiment, if the user space persistent store data has been replicated to the kernel memory, (e.g., comprising both flash memory and volatile memory) the kernel cache controller can retrieve the requested data from an appropriate location and transmit it to the kernel module.

Figure 6:
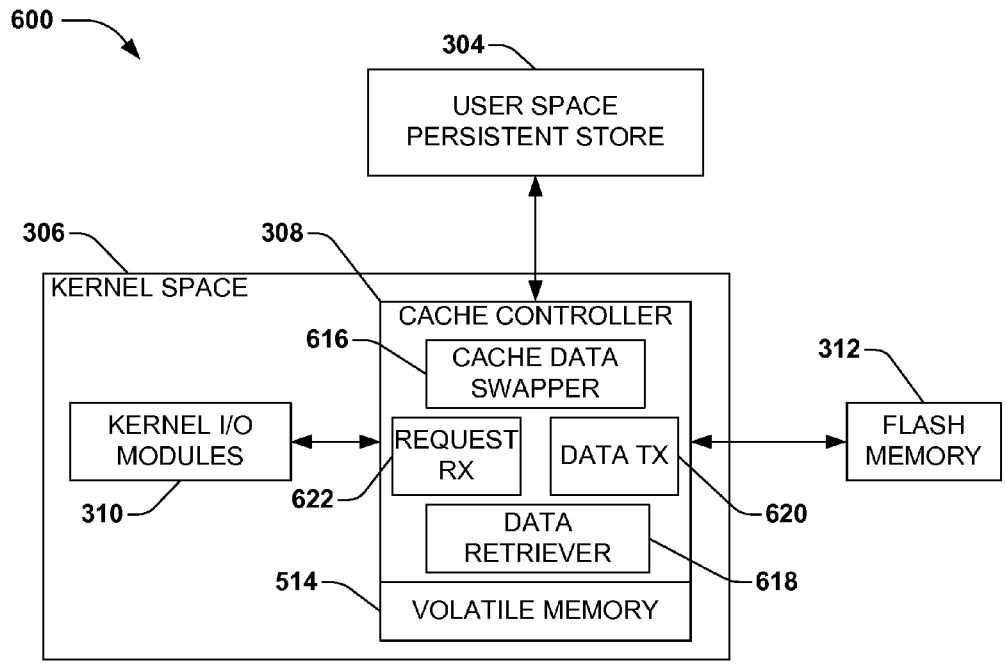
FIG. 6 is an illustration of an exemplary embodiment of one or more components of a system for storing kernel in-memory data caches that are made up of user space persistently stored data.

FIG. 6 is a component block diagram of an exemplary embodiment 600 of a portion of a system described above, where kernel cached data can be swapped between the electronically addressed non-volatile memory 312 and the volatile memory 514, and data requests from a kernel module 310 can be processed. The exemplary embodiment 600 comprises electronically addressed non-volatile memory 312, volatile memory 514, and a cache controller 308, as described above. In this embodiment, the system further comprises a cache data swapping component 616, which can be configured to swap kernel space cache store data between the volatile main memory 514 and the electronically addressed non-volatile memory 312 of the computer system based on a least-recently-used algorithm. As an example, the cache data swapping component 616 can replace data in the volatile memory 514 that has a longest time between accesses, with data from the electronically addressed non-volatile memory 312 that was most recently accessed, by copying the most recently accessed data from the electronically addressed non-volatile memory 312 to the volatile memory 514.

In one embodiment, a swapping of data may comprise copying data from a first component to a temporary memory location while data from a second component is copied to the first component. In this embodiment, after data has been copied from the second component to the first component, the data in the temporary memory can be copied to the second component. It will be appreciated that those skilled in the art may devise alternate means for swapping data between components, and that the techniques and systems, described herein, are not limited to one particular embodiment. For example, data from a first and a second component can be copied to respective first and second temporary volatile memory locations. In this example, data in a first temporary memory location can then be copied to a second component, and data from a second temporary memory location can be copied to a first component.

In the example embodiment 600, the system further comprises a data request receiver 622 configured to receive requests for data in cache from a kernel module, and a data transmitter 620 configured to return requested data to the kernel module. For example, when a kernel module, such as a kernel I/O module, is loaded to the kernel, it may request configuration data. In one embodiment, the data request receiver 622 and data transmitter 620 can be located in the cache controller 308.

In the example embodiment 600, the system further comprises a data retriever 618, which can be configured to retrieve the requested data from the volatile main memory 514 if the requested data is located in the volatile main memory 514. However, if the requested data is not located in the volatile main memory 514, the data retriever 618 can retrieve the requested data from the electronically addressed non-volatile memory 312, and store the requested data in the volatile main memory 514. In this way, for example, if the requested data is retrieved from the electronically addressed non-volatile memory 312, it can become "most recently accessed," and therefore be placed in the volatile main memory 514 after transmission to the kernel module 310. As described above, if needed, room for the "most recently accessed" data can be made in the volatile main memory 514 by having the cache data swapping component 616 copy "least recently accessed" data to the electronically addressed non-volatile memory 312 from the volatile memory 514.

It will be appreciated that, while the exemplary systems shown in FIGS. 3, 5 and 6 illustrate system components located in specific locations, the system described herein is not limited to having these components at the illustrated positions. For example, a system may be configured that comprises a component outside of the cache controller that facilitates cached data swapping. Further, a separate component may be used for processing kernel module requests. Additionally, a computer system may comprise a plurality of nodes in a cluster arrangement. In these embodiments, the components in the exemplary system may be located on respective physical servers and/or in a system manager on one or more of the nodes.

Figure 7:
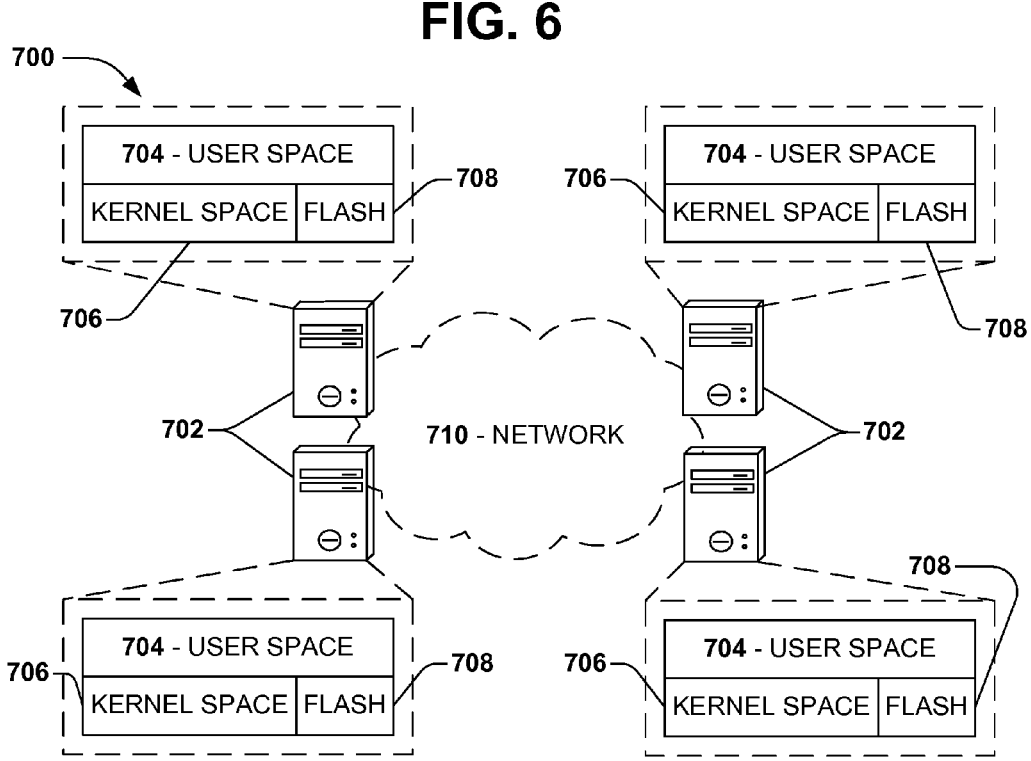
FIG. 7 is an illustration of an example environment where the techniques and systems described herein may be implemented.

FIG. 7 is an illustration of an exemplary environment 700 where the techniques and systems, described herein, may be implemented. In this exemplary environment 700, four nodes 702 (e.g., data storage and management servers) are clustered in a network 710, such as a storage area network (SAN) using Fibre Channel to connect the nodes in an enterprise. Respective nodes comprise user space 704 and kernel space 706 that may be parts of an operating system installed on the nodes.

In this exemplary embodiment 700, a user space persistent store (e.g., configuration data for the clustered system) (not shown) may comprise data for all of the four nodes 702 in the network 710. However, for example, in a storage cluster work load may comprise input and output of data, which can be divided among the respective nodes 702 in the cluster, such that more work may be done concurrently. In this example, this division of work means that it may merely be necessary to cache one quarter of the persistent store to respective kernel memory.

In this embodiment, respective nodes 702 comprise electronically addressed non-volatile memory 708 that is designated for kernel in-memory data caches and, as such, can be used to cache the user space persistent store (e.g., twenty-five percent in each nodes electronically addressed non-volatile memory). Therefore, while the user space persistent store may comprise one hundred percent of the configuration data for the cluster, for example, the electronically addressed non-volatile memory used for kernel caching can comprise merely twenty-five percent of the cluster configuration data. Further, in this embodiment 700, if a node 702 fails, merely twenty-five percent of the user space persistent store needs to be re-replicated to the remaining node's kernel cache.

Computer programming may be configured to store kernel in-memory data cache comprising user space persistently stored data in electronically addressed non-volatile memory. The computer programming may be comprised in a computer usable medium, which when executed on a computing device, can cause the computing device to use a designated amount volatile main memory of a computer system to store kernel space data caches. Further, the computer programming can cause the computing device to use electronically addressed non-volatile memory in the computer system to store kernel in-memory data caches when a desired amount of the designated volatile main memory of the computer system is not available for a kernel space data cache. Additionally, the computer programming can cause the computing device to use a kernel cache controller to populate the electronically addressed non-volatile memory with data kernel in-memory data caches comprising user space persistently stored data. Also, the computer programming can cause the computing device to adjust the designated amount of volatile main memory of a computer system to store kernel space data caches based on desired criteria.

Figure 8:
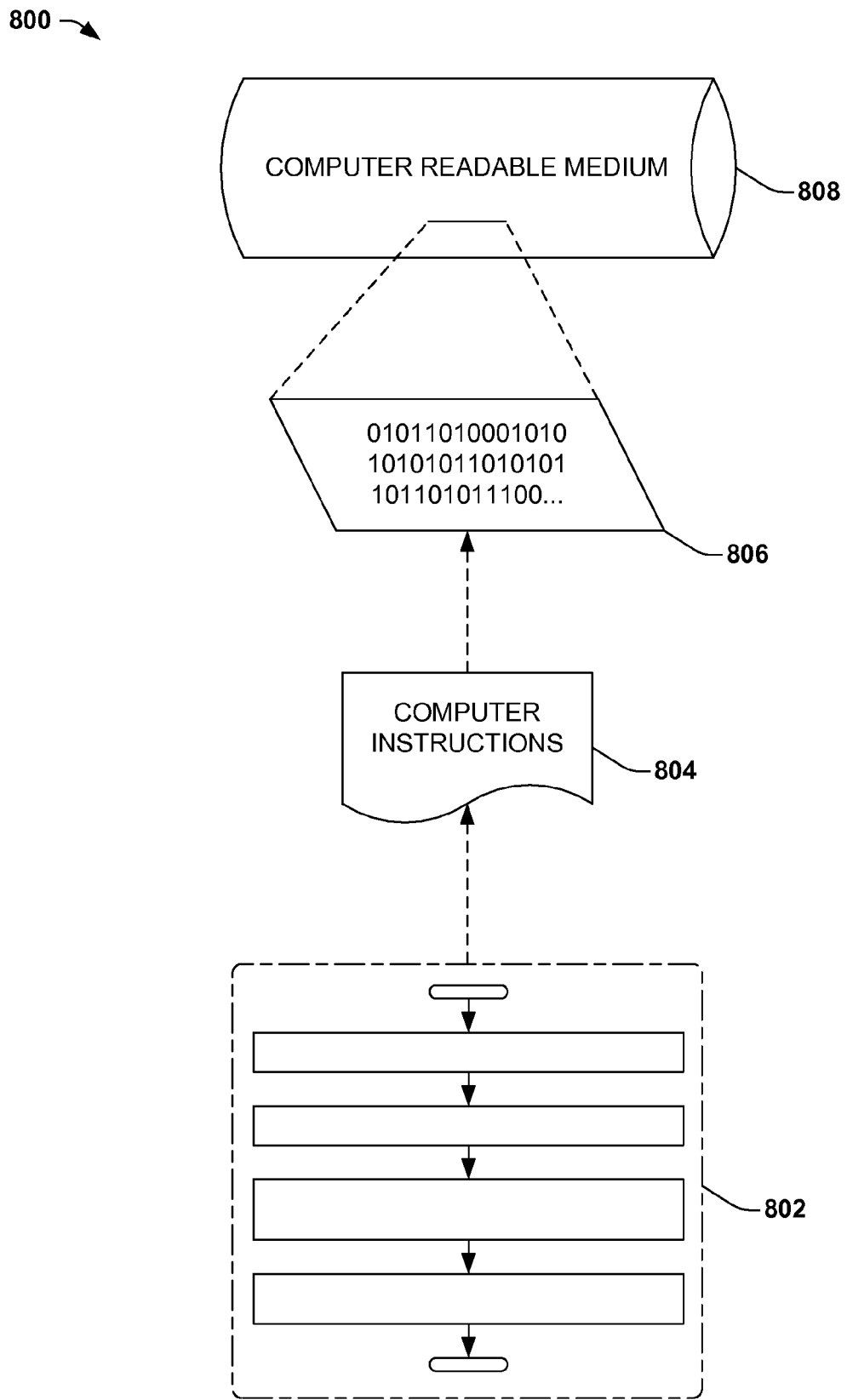
FIG. 8 is an illustration of an exemplary computer-usable medium comprising processor-executable instructions configured to embody one or more of the provisions set forth herein.

An exemplary computer-usable medium that may be devised in these ways is illustrated in FIG. 8, wherein the implementation 800 comprises a computer-usable medium 808 (e.g., a flash-drive, downloadable programming, CD-R, DVD-R, or a platter of a hard disk drive), on which is encoded computer-readable data 806. This computer-readable data 806 in turn comprises a set of computer instructions 804 configured to operate according to one or more of the principles set forth above. In one such embodiment, the processor-executable instructions 804 may be configured to perform the steps described above.

In another such embodiment, the processor-executable instructions 804 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 9:
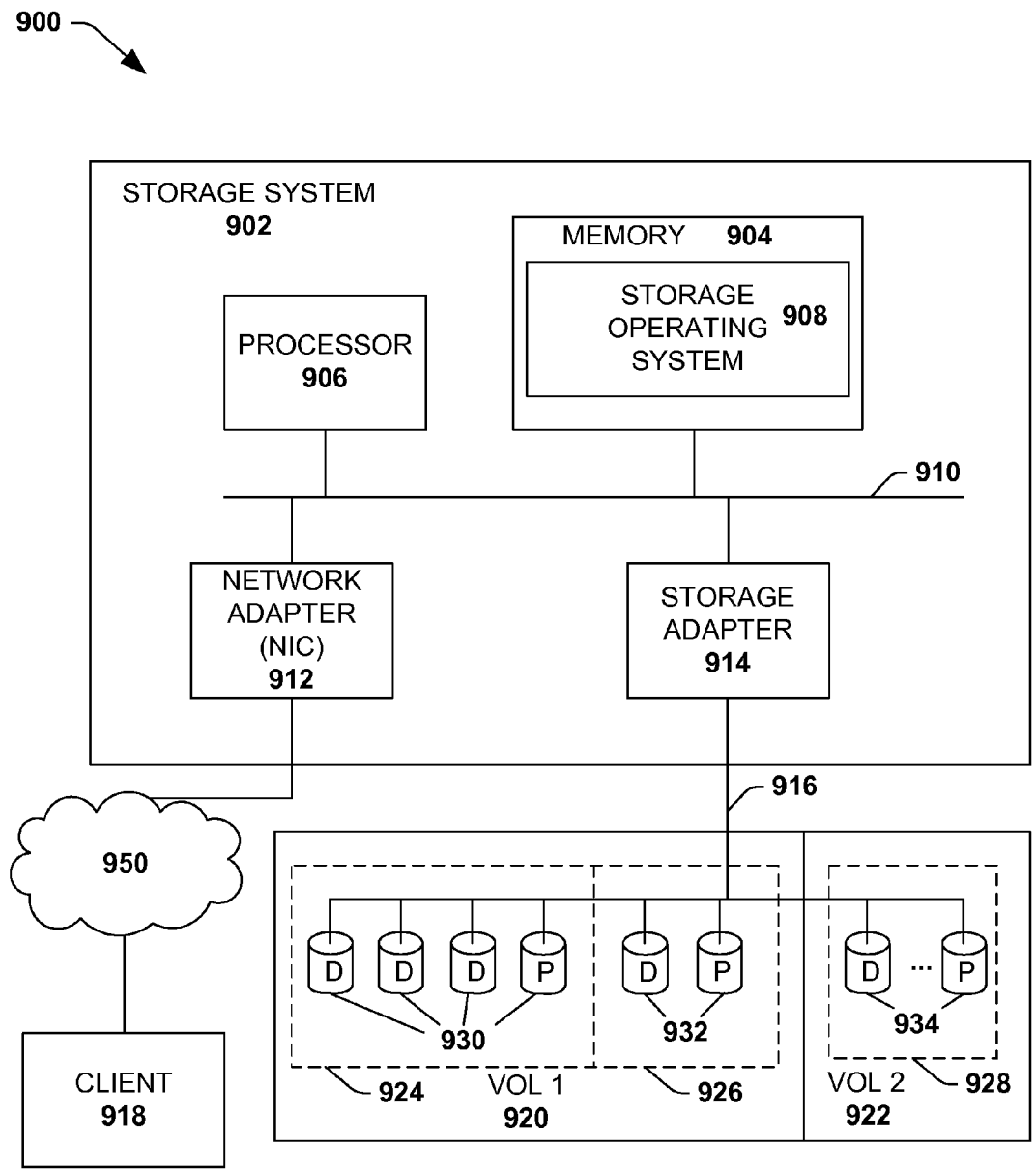
FIG. 9 is a block diagram of an example environment including a storage system wherein one or more of the provisions set forth herein may be implemented.

FIG. 9 is a block diagram of an example embodiment of an environment 900 including a storage system 902 that may implement one or more of the techniques and/or systems, described herein. The storage system 902 may be a computer that provides access to files stored on mass storage devices, such as disks 930, 932, 934 of a disk array 924, 926, 928. It will be appreciated that the techniques and systems, described herein, are not limited by the example embodiment. For example, disks 930, 932, 934 may comprise any type of mass storage devices, including but not limited to magnetic disk drives, flash memory, and any other similar media adapted to store information, including data and parity information.

The storage system 902 includes a processor 906, a memory 904, a network adapter 912 and a storage adapter 914 interconnected by a system bus 910. The storage system 902 also includes a storage operating system 908 that can, for example, implement a Redundant Array of Independent (or Inexpensive) Disks (RAID) optimization system to optimize the reconstruction process of a failed disk in array 924, 926, 928.

In the example environment 900, memory 904 can include storage locations that are addressable by the processor and adapters for storing related software program code and data structures. The processor and adapters may, for example, include processing elements and/or logic circuitry configured to execute the software code and manipulate the data structures. The storage operating system 908, portions of which are typically resident in memory and executed by the processing elements, functionally organizes the storage system by, inter alia and in one embodiment, invoking storage operations in support of a file service implemented by the storage system. It will be apparent to those skilled in the art that other processing and memory means, including various computer readable media, may be used for storing and executing program instructions pertaining to the inventive techniques described herein.

The network adapter 912 includes the mechanical, electrical and signaling circuitry needed to connect the storage system 902 to a client 918 over a computer network 950, which may comprise, among other things, a point-to-point connection or a shared medium, such as a local area network. The client 918 may be a general-purpose computer configured to execute applications. Moreover, the client 918 may interact with the storage system 902 in accordance with a client/server model of information delivery. For example, the client may request the services of the storage system (e.g., acting as a server), and the storage system may return the results of the services requested by the client, by exchanging packets using protocol formats, such as a Common Internet File System (CIFS) protocol or a Network File System (NFS) protocol, over the network 950.

The storage adapter 914 cooperates with the storage operating system 908 executing on the storage system 902 to access information requested by the client 918. The information may be stored on any type of attached array of writeable media such as magnetic disk drives, flash memory, and any other similar media adapted to store information. In the example environment 900, in one embodiment, the information can be stored in disk blocks on the disks 930, 932, 934. The storage adapter 914 includes input/output (I/O) interface circuitry that couples to the disks over an I/O interconnect arrangement, such as a conventional high-performance, Fibre Channel serial link topology. The information is retrieved by the storage adapter 914 and, if necessary, processed by the processor 906 (or the adapter 914 itself) prior to being forwarded over the system bus 910 to the network adapter 912, where the information is formatted into a packet and returned to the client 918.

In one embodiment, storage of information on arrays 924, 926, 928 can be implemented as one or more storage "volumes" 920, 922 that comprise a cluster of disks 930, 932, or 934 defining an overall logical arrangement of disk space. The disks 930, 932, 934 within a volume are typically organized as one or more groups of RAIDs.

In one embodiment, to facilitate access to disks 930, 932, 934, the storage operating system 908 may implement a file system (e.g., write anywhere file system) that logically organizes the information as a hierarchical structure of directories and files on the disks. In this embodiment, respective files may be implemented as a set of disk blocks configured to store information, such as data or parity, whereas the directory may be implemented as a specially formatted file in which other files and directories are stored. In the example environment 900, in one embodiment, the storage operating system 908 may be the NetApp® Data ONTAP® operating system (available from NetApp, Inc., Sunnyvale, Calif.) that implements a Write Anywhere File Layout (WAFL®) file system.

Further, although the storage system 902 is illustrated as a single unit in FIG. 1, it can have a distributed architecture. For example, the storage system 902 can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage system, exporting services to clients; and the D-module acts as the back-end, managing the underlying storage of the storage system. The N-module and D-module can be contained in separate housings and communicate with each other via network connections. Thus, the N-module and the D-module enable a storage server to be physically separated into multiple modules that can be distributed across a network.

In one embodiment, an administrator of the example environment 900 may input via the client 918, for example, criteria regarding when electronically addressed non-volatile memory (e.g., flash memory) should be used to store kernel in-memory data caches that comprise user space persistently stored data. For example, an administrator may input a command that, effective immediately, all or a percentage of kernel in-memory data caches that comprise user space persistently stored data should be stored in electronically addressed non-volatile memory. Alternatively, the administrator may input a command rule providing that the most recently used or the most frequently accessed kernel in-memory data caches that comprise user space persistently stored data be stored in electronically addressed non-volatile memory, for example. This may also, for example, factor-in/be a function-of the amount of RAM available. For example, where less RAM is available or vacant, more kernel in-memory data caches that comprise user space persistently stored data may be stored in electronically addressed non-volatile memory and vice-versa.

It will be appreciated that processes, architectures and/or procedures described herein can be implemented in hardware, firmware and/or software. It will also be appreciated that the provisions set forth herein may apply to any type of special-purpose computer (e.g., file server, filer and/or storage serving appliance) and/or general-purpose computer, including a standalone computer or portion thereof, embodied as or including a storage system. Moreover, the teachings herein can be adapted to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

The operations herein described are exemplary and imply no particular order. Further, the operations can be used in any sequence when appropriate and can be partially used (e.g., not all actions may be necessary). It should be understood that various computer-implemented operations involving data storage may comprise manipulation of physical quantities that may take the form of electrical, magnetic, and/or optical signals capable of being stored, transferred, combined, compared and/or otherwise manipulated, for example.

Computer usable media is intended to comprise any mechanism that can store data, which can be thereafter, be read by a computer system. Examples of computer readable media include hard drives (e.g., accessible via network attached storage (NAS)), Storage Area Networks (SAN), volatile and non-volatile memory, such as read-only memory (ROM), random-access memory (RAM), EEPROM and/or electronically addressed non-volatile memory, CD-ROMs, CD-Rs, CD-RWs, DVDs, cassettes, magnetic tape, magnetic disk storage, optical or non-optical data storage devices and/or any other medium which can be used to store data. Computer usable media may also comprise communication media, which typically embodies computer readable instructions or other data in a modulated data signal such as a carrier wave or other transport mechanism (e.g., that has one or more of its characteristics set or changed in such a manner as to encode information in the signal). The computer usable medium can also be distributed (e.g., using a switching fabric, such as used in computer farms) over a network-coupled computer system so that computer readable code is stored and executed in a distributed fashion.

The foregoing description has been directed to particular embodiments. It will be apparent, however, that other variations and modifications may be made to the described embodiments, with the attainment of some or all of their advantages. Specifically, it should be noted that one or more of the principles set forth herein may be implemented in non-distributed file systems. Furthermore, while this description has been written in terms of separate remote and support systems, the teachings are equally suitable to systems where the functionality of the remote and support systems are implemented in a single system. Alternately, the functions of remote and support systems may be distributed among any number of separate systems, wherein respective systems perform one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the spirit and scope of the disclosure herein.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Moreover, the word "exemplary" is used herein to mean serving as an example, instance, or illustration. That is anything described herein as "exemplary" is not necessarily to be construed as advantageous over other aspects or designs. Also, unless specified to the contrary, the term "or" is intended to mean an inclusive "or" rather than an exclusive "or", and the articles "a" and "an" are generally to be construed to comprise "one or more". Furthermore, to the extent that the terms "includes", "having", "has", "with", or variants thereof are used, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

What is claimed is:

1. A method for storing and efficiently accessing a kernel cache comprising cached user space data, the method comprising:
   storing user space data, stored in user space memory, within a kernel cache maintained in kernel designated non-volatile memory of a computer system resulting in cached user space data; and
   upon detecting a modification to user space data stored in user space memory, synchronizing the cached user space data stored within the kernel cache with the user space data stored in user space memory.

2. The method of claim 1, comprising:
   storing user space data, stored in user space memory but not stored within the kernel cache, within a volatile kernel cache maintained in kernel designated volatile memory of the computer system resulting in cached volatile user space data.

3. The method of claim 2, comprising:
   swapping cached user space data and cached volatile user space data between the kernel cache and the volatile kernel cache based upon a least-recently-used algorithm.

4. The method of claim 2, comprising:
   determining whether requested user space data is stored within the volatile kernel cache;
   if the requested user space data is stored within the volatile kernel cache, then providing access to corresponding cached volatile user space data within the volatile kernel cache; and
   if the requested user space data is not stored within the volatile kernel cache, then:
     determining the requested user space data is stored within the kernel cache; and
     providing access to corresponding cached user space data within the kernel cache.

5. The method of claim 4, comprising:
   upon providing access to corresponding cached user space data within the kernel cache:
     storing the corresponding cached user space data into the volatile kernel cache.

6. A system for storing and efficiently accessing a kernel cache comprising cached user space data, the system comprising:
   a kernel cache controller configured to:
     store user space data, stored in user space memory, within a kernel cache maintained in kernel designated non-volatile memory of a computer system resulting in cached user space data; and
     synchronize the cached user space data stored within the kernel cache with the user space data stored in user space memory based upon detecting a modification to user space data stored in user space memory.

7. The system of claim 6, the kernel cache controller configured to:
store user space data, stored in user space memory but not stored within the kernel cache, within a volatile kernel cache maintained in kernel designated volatile memory of the computer system resulting in cached volatile user space data.

8. The system of claim 7, comprising a cache data swapping component configured to:
swap cached user space data and cached volatile user space data between the kernel cache and the volatile kernel cache based upon a least-recently-used algorithm.

9. The system of claim 7, the kernel cache controller configured to:
determine whether requested user space data is stored within the volatile kernel cache;
if the requested user space data is stored within the volatile kernel cache, then provide access to corresponding cached volatile user space data within the volatile kernel cache; and
if the requested user space data is not stored within the volatile kernel cache, then:
determine the requested user space data is stored within the kernel cache; and
provide access to corresponding cached user space data within the kernel cache.

10. The system of claim 9, the kernel cache controller configured to:
upon providing access to corresponding cached user space data within the kernel cache:
store the corresponding cached user space data into the volatile kernel cache.

11. A non-transitory computer readable medium comprising computer executable instructions that when executed by a processor implement a method comprising:
storing user space data, stored in user space memory, within a kernel cache maintained in kernel designated non-volatile memory of a computer system resulting in cached user space data; and
upon detecting a modification to user space data stored in user space memory, synchronizing the cached user space data stored within the kernel cache with the user space data stored in user space memory.

12. The method of claim 11, the non-volatile memory comprising flash memory.

13. The method of claim 11, the synchronizing comprising:
synchronizing the cached user space data stored within the kernel cache with the user space data stored in user space memory based upon a boot event.

14. The method of claim 11, comprising:
storing user space data, stored in user space memory but not stored within the kernel cache, within a volatile kernel cache maintained in kernel designated volatile memory of the computer system resulting in cached volatile user space data.

15. The method of claim 14, comprising:
swapping cached user space data and cached volatile user space data between the kernel cache and the volatile kernel cache based upon a least-recently-used algorithm.

16. A method for storing and efficiently accessing a kernel cache comprising cached user space system configuration data and cached kernel space data, the method comprising:
storing user space system configuration data, not stored in user space memory, and kernel space data within a kernel cache maintained in kernel designated non-volatile memory of a computer system resulting in cached user space system configuration data and cached kernel space data; and
providing access to cached user space system configuration data and cached kernel space data stored in the kernel cache.

17. The method of claim 16, comprising:
storing user space system configuration data, not stored within the kernel cache, within a volatile kernel cache maintained in kernel designated volatile memory of the computer system resulting in cached volatile user space system configuration data.

18. The method of claim 17, comprising:
swapping cached user space system configuration data and cached volatile user space system configuration data between the kernel cache and the volatile kernel cache based upon a least-recently-used algorithm.

19. The method of claim 17, comprising:
determining whether requested user space system configuration data is stored within the volatile kernel cache;
if the requested user space system configuration data is stored within the volatile kernel cache, then providing access to corresponding cached volatile user space system configuration data within the volatile kernel cache; and
if the requested user space system configuration data is not stored within the volatile kernel cache, then:
determining the requested user space system configuration data is stored within the kernel cache; and
providing access to corresponding cached user space system configuration data within the kernel cache.

20. The method of claim 19, comprising:
upon providing access to corresponding cached user space system configuration data within the kernel cache:
storing the corresponding cached user space system configuration data into the volatile kernel cache.

21. A system for storing and efficiently accessing a kernel cache comprising cached user space system configuration data and cached kernel space data, the system comprising:
a kernel cache controller configured to:
store user space system configuration data, not stored in user space memory, and kernel space data within a kernel cache maintained in kernel designated non-volatile memory of a computer system resulting in cached user space system configuration data and cached kernel space data; and
provide access to cached user space system configuration data and cached kernel space data stored in the kernel cache.

22. The system of claim 21, the kernel cache controller configured to:
store user space system configuration data, not stored within the kernel cache, within a volatile kernel cache maintained in kernel designated volatile memory of the computer system resulting in cached volatile user space system configuration data.

23. The system of claim 22, comprising a cache data swapping component configured to:
swap cached user space system configuration data and cached volatile user space system configuration data between the kernel cache and the volatile kernel cache based upon a least-recently-used algorithm.

24. The system of claim 22, the kernel cache controller configured to:
determine whether requested user space system configuration data is stored within the volatile kernel cache;

if the requested user space system configuration data is stored within the volatile kernel cache, then provide access to corresponding cached volatile user space system configuration data within the volatile kernel cache; and if the requested user space system configuration data is not stored within the volatile kernel cache, then:

determine the requested user space system configuration data is stored within the kernel cache; and provide access to corresponding cached user space system configuration data within the kernel cache.

25. The system of claim 24, the kernel cache controller configured to:

upon providing access to corresponding cached user space system configuration data within the kernel cache:

store the corresponding cached user space system configuration data into the volatile kernel cache.

* * * * *